(12) United States Patent
Galati (10) Patent No.: US 9,873,216 B2
(45) Date of Patent: Jan. 23, 2018

(54) ACTUATOR SYSTEM FOR ROTATING VALVE PIN

(71) Applicant: Synventive Molding Solutions, Inc., Peabody, MA (US)

(72) Inventor: Vito Galati, Rowley, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 303 days.

(21) Appl. No.: 14/962,358

(22) Filed: Dec. 8, 2015

(65) Prior Publication Data

US 2016/0136854 A1 May 19, 2016

Related U.S. Application Data

(63) Continuation of application No. PCT/US2014/052639, filed on Aug. 26, 2014.

(51) Int. Cl.
*B29C 45/23* (2006.01)
*B29C 45/00* (2006.01)
(Continued)

(52) U.S. Cl.
CPC ........ *B29C 45/0046* (2013.01); *B29C 45/231* (2013.01); *B29C 45/281* (2013.01); *B29C 45/76* (2013.01); *B29C 45/7613* (2013.01); *B29C 45/30* (2013.01); *B29C 2045/1794* (2013.01); *B29C 2045/2882* (2013.01); (Continued)

(58) Field of Classification Search
CPC .. B29C 2045/1794; B29C 2945/76568; B29C 2945/76755; B29C 2945/76859; B29C 45/0046; B29C 45/231; B29C 45/281; B29C 45/7613; B29C 2045/2882; B29C 2045/308; B29C 45/03; B29C 45/30; B29C 45/76
See application file for complete search history.

(56) References Cited

U.S. PATENT DOCUMENTS

2006/0204611 A1* 9/2006 Serniuk ............... B29C 45/2725
425/573
2008/0317896 A1 12/2008 Boxwala et al.
(Continued)

FOREIGN PATENT DOCUMENTS

| DE | 199 49 850 A1 | 12/2000 |
| JP | S55 135635 A | 10/1980 |
| JP | H02 178012 A | 7/1990 |

OTHER PUBLICATIONS

Int'l. Preliminary Report on Patentability dated Nov. 20, 2015 in Int'l. Appl'n. PCT/US2014/052639.
(Continued)

*Primary Examiner* — Jill L Heitbrink
(74) *Attorney, Agent, or Firm* — Polsinelli PC (57) ABSTRACT

An injection molding apparatus comprising an injection molding machine, a manifold, a closure valve pin, a first actuator having a linear or axial driver, a second actuator comprising a rotor interconnected to either the closure valve pin or to a second valve pin such that either the closure valve pin or the second valve pin is rotatably driven in unison with the rotor around the rotation axis, the closure pin or second pin being disposed and rotatable within the flow of injection fluid flowing through a flow channel leading to a mold cavity.

16 Claims, 6 Drawing Sheets

(51) Int. Cl.
 *B29C 45/28* (2006.01)
 *B29C 45/76* (2006.01)
 *B29C 45/30* (2006.01)
 *B29C 45/17* (2006.01)

(52) U.S. Cl.
 CPC .................. *B29C 2045/308* (2013.01); *B29C 2945/76568* (2013.01); *B29C 2945/76755* (2013.01); *B29C 2945/76859* (2013.01)

(56) References Cited

U.S. PATENT DOCUMENTS

2010/0159062 A1 6/2010 Klobucar et al.
2014/0327173 A1 11/2014 Jenko et al.

OTHER PUBLICATIONS

Int'l. Search Report dated Dec. 11, 2014 in Int'l. Appln. PCT/US2014/052639.
Written Opinion dated Jul. 21, 2015 in Int'l. Appln. PCT/US2014/052639.

\* cited by examiner

ACTUATOR SYSTEM FOR ROTATING VALVE PIN

RELATED APPLICATIONS

This application is a continuation of and claims the benefit of priority to PCT/US2014/052639 filed Aug. 26, 2014, the disclosure of which is incorporated by reference as if fully set forth herein.

The disclosures of all of the following are incorporated by reference in their entirety as if fully set forth herein: U.S. Pat. No. 5,894,025, U.S. Pat. No. 6,062,840, U.S. Pat. No. 6,294,122, U.S. Pat. No. 6,309,208, U.S. Pat. No. 6,287,107, U.S. Pat. No. 6,343,921, U.S. Pat. No. 6,343,922, U.S. Pat. No. 6,254,377, U.S. Pat. No. 6,261,075, U.S. Pat. No. 6,361,300 (7006), U.S. Pat. No. 6,419,870, U.S. Pat. No. 6,464,909 (7031), U.S. Pat. No. 6,599,116, U.S. Pat. No. 7,234,929 (7075US1), U.S. Pat. No. 7,419,625 (7075US2), U.S. Pat. No. 7,569,169 (7075US3), U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068), U.S. application Ser. No. 10/101,278 filed Mar. 19, 2002 (7070) and international applications PCT/US2011/062099 and PCT/US2011/062096.

BACKGROUND OF THE INVENTION

Injection molding systems using actuators directly connected to a valve pin to drive the valve pin along a back and forth upstream, downstream path of travel have been employed in systems requiring a valve for stopping and starting injection flow through one or more gates to one or more mold cavities.

SUMMARY OF THE INVENTION

In accordance with the invention there is provided an injection molding apparatus comprising an injection molding machine, a manifold that receives injection fluid from the machine and routes the injection fluid through a flow channel such as manifold channel and nozzle channel communicating with a gate to a cavity of a mold, a first actuator and a second actuator, a closure valve pin having a pin axis A interconnected to the actuators, the closure valve pin being adapted to controllably drive the valve pin 120 upstream and downstream along an axial path of travel A through the flow channel such that a distal tip end of the valve pin is driven into and out of a position that closes flow through the gate, the first actuator 90 having a linear or axial driver drivable along a reciprocal path of travel coincident or parallel to the axial path of travel A, the closure valve pin 120 being interconnected to the first actuator 90 such that the valve pin is driven along the axial path of travel A and reciprocally upstream and downstream into and out of the position that closes flow through the gate 70, the second actuator 100, 150 comprising a rotor 102, 152 having a rotation axis A, IA, the rotor being interconnected to either the closure valve pin 120 or to a second valve pin 160 such that either the closure valve pin 120 or the second valve pin 160 is rotatably driven in unison with the rotor 102, 152 around an axis that is coincident A with or parallel IA to the pin axis A of the closure pin, the closure pin 120 or second pin 160 that is interconnected to the rotor 120, 152 being disposed within the flow of injection fluid 15 that is routed through the manifold 50.

The second actuator 152 can be mounted such that the axis of the rotor 152 is generally coincident IA with an inlet that communicates flow of injection fluid 15 from the machine 20 to the manifold 50.

The second actuator 152 can be interconnected to the second valve pin 160.

The second actuator 100 can be mounted to the first actuator 90 where the closure valve pin 120 is non-rotatably interconnected to the rotor 102 of the second actuator 100 and the second actuator 100 and the closure valve pin 120 are adapted to travel along the axial path of travel A together with the linear or axial driver 92 of the first actuator 90.

The second valve pin 160 can comprise an elongated shaft having an outer circumferential surface having discontinuous protrusions 123, grooves 129, projections, fins or apertures one or more collectively 162 that generate a selected turbulence in the injection fluid 15 flowing over the outer circumferential surface when the valve pin 160 is rotated R around its pin axis IA.

The closure valve pin 120 can comprise an elongated shaft having an outer circumferential surface having discontinuous protrusions 123, grooves 129, projections, fins or apertures one or more collectively 127 that generate a selected turbulence in the injection fluid 15 flowing over the outer circumferential surface when the valve pin 120 is rotated around its pin axis A.

Where the valve pin 120 or 160 has circumferential surface that has protrusions 123, grooves 129, fins, apertures or the like 162, the valve pin is mounted, arranged and adapted such that the circumferential surface is disposed within the fluid flow 15 flowing through a flow channel such as channel 40 or 63. The pin 120 or 160 is controllably rotatable R such that the circumferential surface containing the protrusions, fins 123 or the like rotate within the fluid flow 15 flowing through a fluid flow channel such as channel 40 or 63.

The head 122 of the pin 120, 160 that is interconnected to the rotor 102, 152 is preferably interconnected such that the pin rotates R around the rotation axis A, IA in unison with rotation of the rotor.

One or the other or both of the actuators 90, 100, 150 can be interconnected to a controller 300 that controllably instructs the actuators to drive the one or the other or both of the closure valve pin 120 and the second valve pin 160 according to a predetermined profile of axial travel or rotation.

In another aspect of the invention there is provided a method of driving a valve pin in an injection molding apparatus comprised of an injection molding machine, a manifold that receives injection fluid from the machine and routes the injection fluid through a flow channel communicating with a gate to a cavity of a mold, a first actuator and a second actuator, a closure valve pin having a pin axis interconnected to the actuators, the closure valve pin being adapted to controllably drive the valve pin upstream and downstream along an axial path of travel through the flow channel such that a distal tip end of the valve pin is driven into and out of a position that closes flow through the gate, the method comprising:

interconnecting a closure valve pin to a first actuator having an axial driver drivable along a reciprocal path of travel coincident with or parallel to the axial path of travel such that the valve pin is driven along the axial path of travel and reciprocally upstream and downstream into and out of the position that closes flow through the gate, interconnecting either the closure valve pin or a second valve pin to a second actuator comprising a rotor having a rotation axis such that the closure valve pin or the second valve pin is rotatably driven in unison with the rotor around an axis coincident with or parallel to the pin axis of the closure valve pin, adapting the pin that is interconnected to the rotor to be disposed within the flow of injection fluid that is routed from the injection molding machine to the gate, driving the first actuator to drive its interconnected pin into and out of the position that closes flow through the gate, driving the second actuator such that its interconnected pin is rotatably driven in unison with the rotor and such that a selectable portion of the interconnected pin is rotated within the flow of injection fluid that is.

Such a method typically further comprises mounting the second actuator such that the axis of the rotor is generally coincident with an inlet that communicates flow of injection fluid from the machine to the manifold.

Such a method typically further comprises interconnecting the second valve pin to the rotor.

Such a method can further comprise mounting the second actuator to the first actuator, interconnecting the closure valve pin non-rotatably to the rotor of the second actuator and adapting the second actuator and the closure valve pin to travel along the axial path of travel together with the axial driver of the first actuator.

Typically the second valve pin is formed to comprise an elongated shaft having an outer circumferential surface having discontinuous protrusions, grooves, projections, fins or apertures that generate a selected turbulence in the injection fluid flowing over the outer circumferential surface when the valve pin is rotated around its pin axis.

Preferably the head of the pin that is interconnected to the rotor is interconnected such that the pin rotates around the rotation axis in unison with rotation of the rotor.

Such a method can further comprise instructing the actuators to drive the one or the other or both of the closure valve pin and the second valve pin according to a predetermined profile of axial travel or rotation over the course of an injection cycle.

In another aspect of the invention there is provided an injection molding apparatus comprising an injection molding machine, a manifold that receives injection fluid from the machine and routes the injection fluid through a fluid flow channel communicating with a gate to a cavity of a mold, a first actuator and a second actuator, a valve pin having a pin axis interconnected to the actuators, the actuators and the valve pin being arranged for controllably driving the valve pin axially upstream and downstream through the flow channel such that a distal tip end of the valve pin is driven into and out of a position that closes flow through the gate, the first actuator having an axial driver drivable along a reciprocal path of axial travel, the second actuator being mounted to the axial driver such that the second actuator is driven along the path of axial travel, the valve pin being mounted to the second actuator such that the valve pin is driven along the path of axial travel, the second actuator comprising a rotor that is rotatably driven around an axis coincident or parallel to the path of axial travel, the rotor of the second actuator being interconnected to the valve pin such that a selected portion of the valve pin is disposed within the fluid flow channel leading to the gate and the selected portion of the valve pin is rotatably driven to rotate the selected portion of the pin within the fluid flow channel.

The valve pin preferably comprises an elongated shaft having an outer circumferential surface having discontinuous protrusions, grooves, projections, fins or apertures that are disposed within a fluid flow channel, the valve pin being controllably rotatable to rotate the protrusions, grooves, projections, fins or apertures within the injection fluid flowing through the fluid flow channel and to generate a selected turbulence in the injection fluid when the valve pin is rotated R around its pin axis.

The first and second actuators are typically driven individually or collectively by hydraulic fluid, pneumatic fluid or an electric motor.

The valve pin preferably has a head that is interconnected to the rotor of the second actuator such that the valve pin is non-rotatably mounted relative to the rotor.

The head of the valve pin is interconnected to the rotor such that the valve pin rotates around its pin axis in unison with rotation of the rotor.

One or the other or both of the actuators is preferably interconnected to a controller that controllably instructs the actuators to drive the valve pin according to a predetermined profile of axial travel or rotation.

In another aspect of the invention there is provided, a method of driving a valve pin in an injection molding apparatus comprised of an injection molding machine, a manifold that receives injection fluid from the machine and routes the injection fluid through a flow channel communicating with a gate to a cavity of a mold and a valve pin having a pin axis and a distal tip end, the method comprising:

mounting a rotary actuator having a drivable rotor to a linear actuator having an axial driver in an arrangement wherein the rotary actuator moves along a path of travel together with the axial driver, interconnecting the valve pin to the rotor of the rotary actuator such that the valve pin rotates in unison with the rotor when driven and moves along the path travel together with the axial driver when driven, arranging the axial actuator, rotary actuator and valve pin such that the valve pin is drivably disposed and mounted within the flow channel for reciprocal upstream, downstream movement within the flow channel, driving the axial driver of the linear actuator to drive the distal tip end of the valve pin axially into and out of the position that closes flow through the gate.

Such a method preferably further comprises driving the rotary actuator to rotate the valve pin around the pin axis at one or more periods of time while the pin is driven axially.

Such a method typically further comprises forming the valve pin in the form of an elongated shaft having a circumferential surface where the circumferential has one or more of protrusions, grooves, projections, fins or apertures formed therein or attached thereto.

Such a method preferably further comprises interconnecting a head of the pin to the rotor of the rotary actuator such that the valve pin is non-rotatably mounted relative to the rotor and interconnecting a head of the pin to the rotor such that the valve pin rotates around its pin axis in unison with rotation of the rotor.

Such a method typically further comprises interconnecting one or the other or both of the actuators to a controller that controllably instructs the actuators to drive the valve pin according to a predetermined profile of axial travel or rotation.

In another aspect of the invention there is provided a method of performing an injection cycle, the method comprising injecting a fluid material 15 from an injection molding machine 20 into an apparatus comprised of a manifold 50 that receives the injection fluid 15 from the injection molding machine 20 and routes the injection fluid 15 through a flow channel such as manifold channel 40 and nozzle 60 channel 63 communicating with a gate 70 to a cavity 80 of a mold 82, a first actuator 90 and a second actuator 100, 150, a closure valve pin 120 having a pin axis A interconnected to the actuators, the closure valve pin 120 being adapted to controllably drive the valve pin 120 upstream and downstream along an axial path of travel A through the flow channel such that a distal tip end 124, 124a of the valve pin 120 is driven into and out of a position that closes flow through the gate 70, the first actuator 90 having a linear or axial driver 92 drivable along a reciprocal path of travel coincident or parallel to the axial path of travel A, the closure valve pin 120 being interconnected to the first actuator 90 such that the valve pin is driven along the axial path of travel A and reciprocally upstream and downstream into and out of the position that closes flow through the gate 70, the second actuator 100, 150 comprising a rotor 102, 152 having a rotation axis A, IA, the rotor being interconnected to either the closure valve pin 120 or to a second valve pin 160 such that either the closure valve pin 120 or the second valve pin 160 is rotatably driven in unison with the rotor 102, 152 around an axis that is coincident with A or parallel IA to the axial path of travel A of the closure pin, the closure pin 120 or second pin 160 that is interconnected to the rotor 120, 152 the closure pin 120 or second pin 160 having a selected portion that is disposed and controllably rotatable within the flow of injection fluid 15 through the fluid flow channel 40, 63.

BRIEF DESCRIPTION OF THE DRAWINGS

The above and further advantages of the invention may be better understood by referring to the following description in conjunction with the accompanying drawings in which.

DETAILED DESCRIPTION

Figure 1:
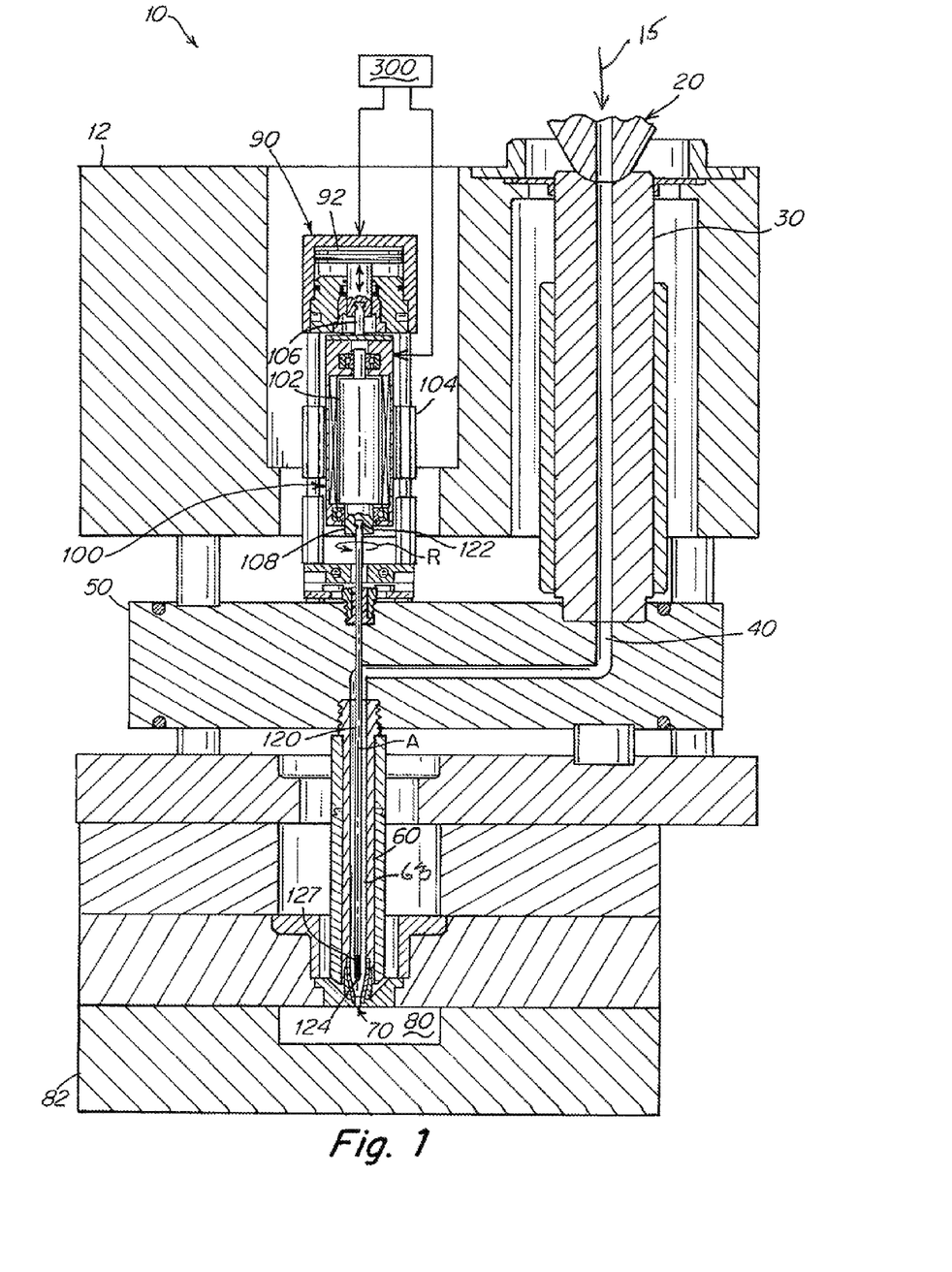
FIG. 1 is a schematic cross-sectional view of one embodiment of the invention showing a linear actuator assembled together with a rotary actuator such that the rotary actuator together with a valve pin attached to the rotor of the linear actuator both move translationally together with the piston of the actuator.

FIG. 1 shows an injection molding system 10 comprised of an injection molding machine 20 that injects fluid material under pressure at high temperature through an inlet 30 into a distribution flow channel 40 of a hotrunner or manifold 50 that routes the injection fluid to the bore or flow channel of a nozzle 60 having a terminal downstream aperture or gate 70 that communicates with the cavity 80 of a mold 82 such that when the gate 70 is open injection fluid flows downstream into the cavity 80.

A linear actuator 90 having a linear driver or piston 92 that is controllably drivable in an upstream-downstream reciprocal manner along an axis A that is in-line with the flow channel or bore of the nozzle 60 is mounted in a stationary position relative to either a top clamp plate 12 or the manifold 50. In the embodiment shown in FIGS. 1, 2, the linear actuator comprises a fluid driven device typically either hydraulic (such as oil) or pneumatic (such as air) driven where a piston 92 is housed within the sealed bore of a cylinder and driven by controllable pumping of the fluid into and out of upstream and downstream drive chambers within the cylinder that houses the piston. The piston is prevented from rotating in the cylinder by guide rod 96 and bore 98. The housing or support 104 of second rotary actuator 100 is mounted to the linear driver or piston 92 via a connector 106 such that the rotary actuator 100 is movable in the axial direction A in unison with movement of the piston 92. The housing is mounted on sleeves 110 and slides along guide rods 112. The rotary actuator includes a central controllably rotatable rotor 102 that is controllably rotatable R around the axis A of the path of linear travel of the piston 92.

The valve pin 120 is connected to the rotor 102 via a head 122 such that the valve pin 120 moves or translates in unison axially A with axial movement of the piston 92 and rotary actuator 100. The distal tip end 124 of the valve pin 120 is moved axially into and out of a closed gate position during the course of an injection cycle axial movement A of piston 92, actuator 100 and its interconnected valve pin 120. The head 122 of the valve pin 120 is connected to the rotor 102 in a manner such as shown in FIGS. 6A-6C such that the pin 120 is secure against rotation relative to the rotor 102 itself and at the same time fixedly connected to the rotor 102 whereby the pin 120 rotates R in unison with rotation R of the rotor 102.

Figure 2:
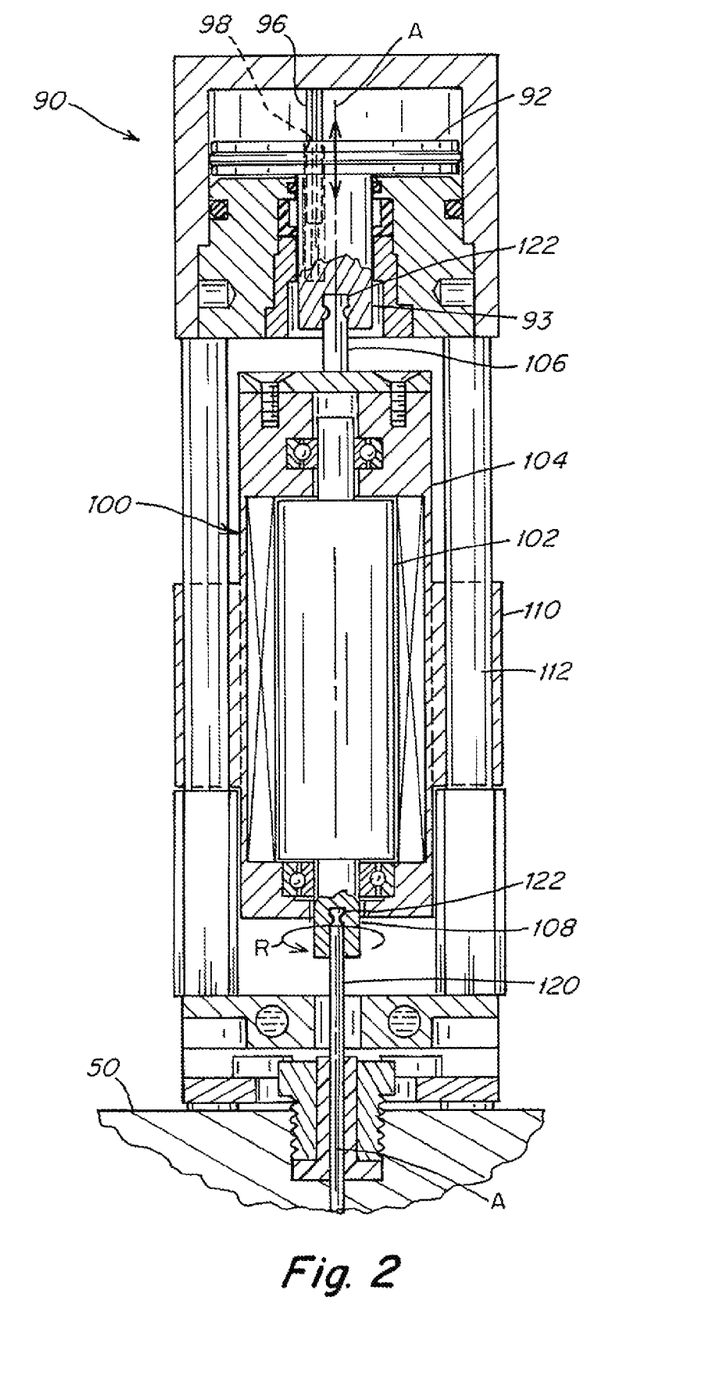
FIG. 2 is an enlarged detail view of a portion of FIG. 1 showing in greater details the mounting of the rotary actuator to the piston of the linear actuator.
Figure 3:
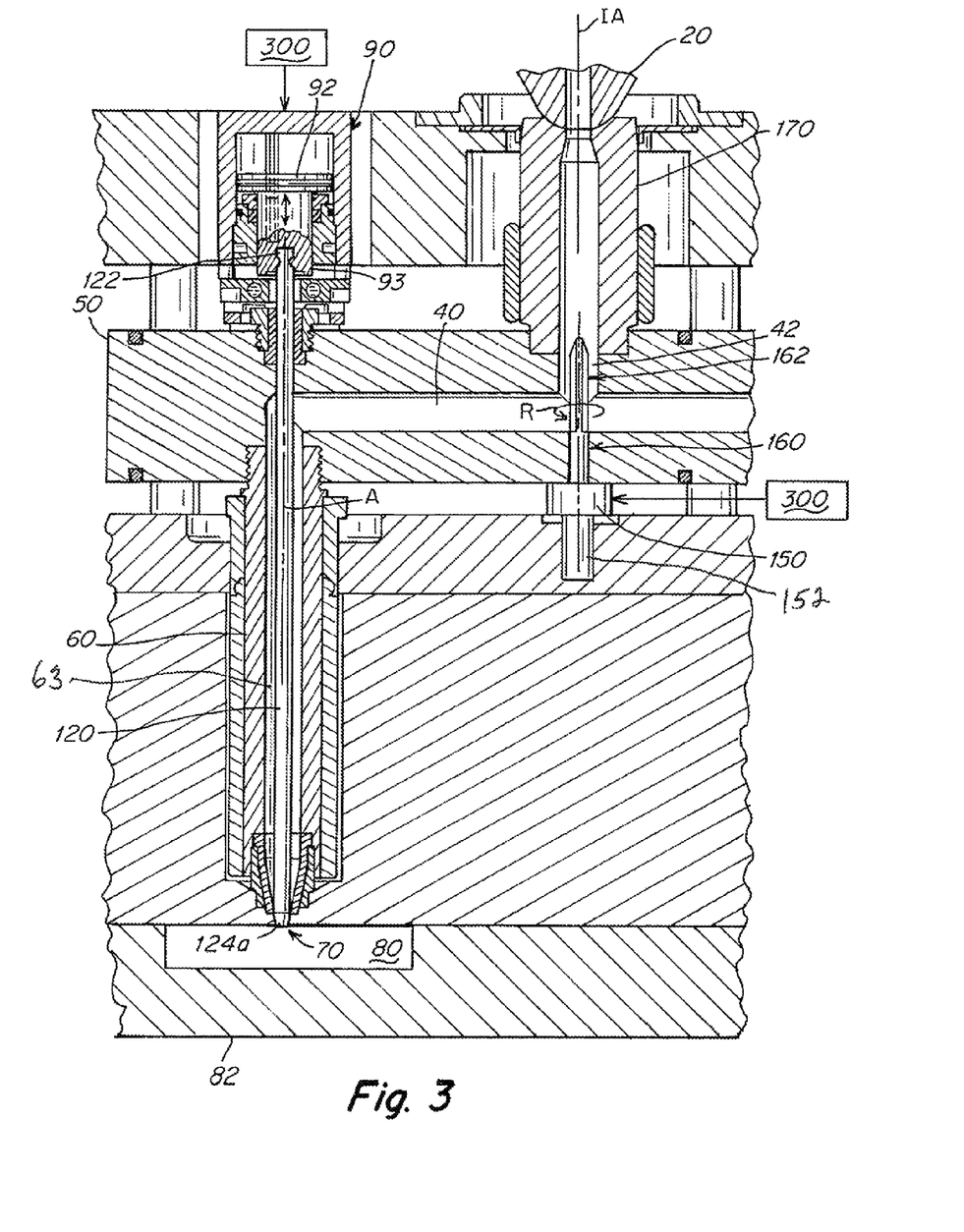
FIG. 3 is a schematic cross-sectional view of another embodiment of the invention showing a linear actuator connected to a first valve pin mounted in-line with the gate of a mold and a second rotary actuator connected to a second fluted valve pin both mounted in-line with the inlet from the injection machine to the fluid distribution manifold
Figure 6:
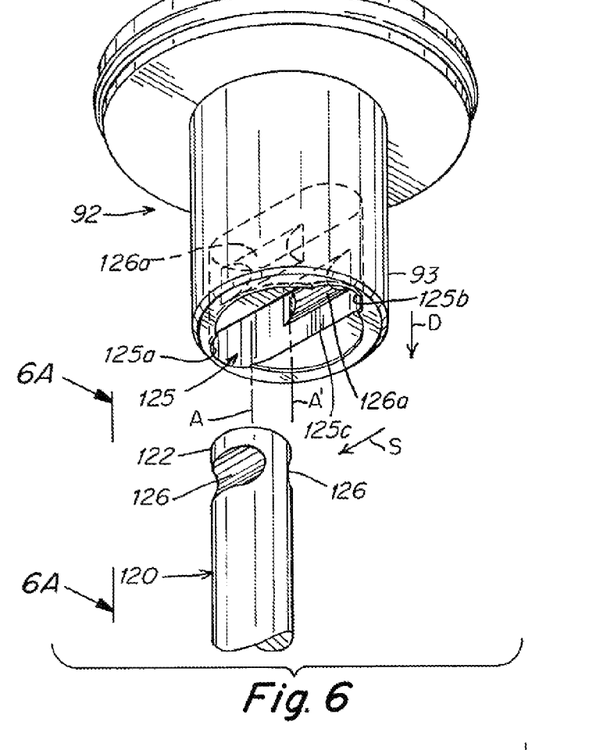
FIG. 6 is an exploded perspective view of a typical valve pin connector and valve pin.
Figure 6A:
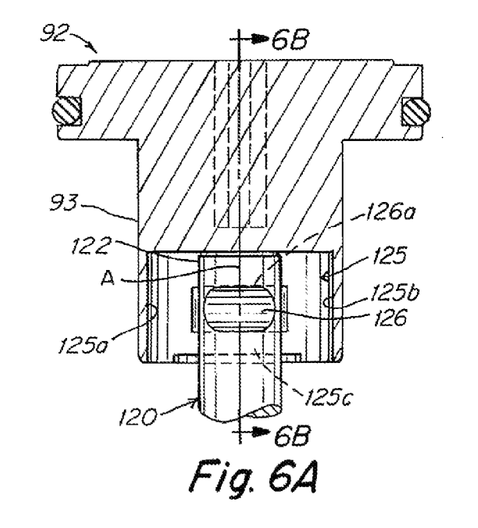
FIGS. 6A-6B are sectional views along sections of the valve pin connector and valve pin showing details of the configuration of the head of the valve pin that is mated with the connector in a fashion that mounts that valve pin for non-rotation relative to the connector.
Figure 6B:
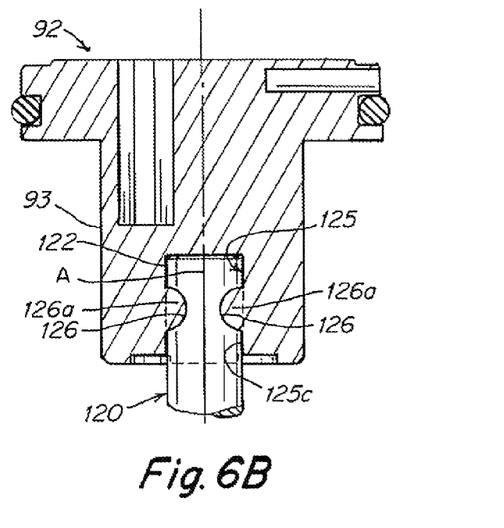
Figure 6C:
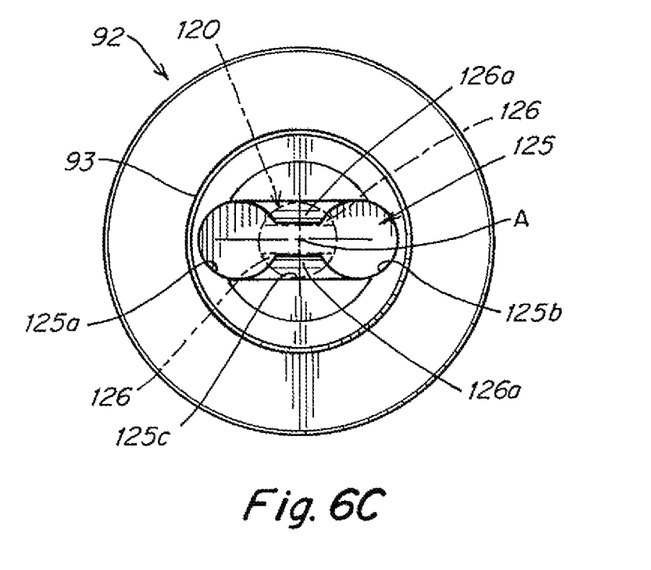
FIG. 6C is a bottom plan view of the piston of FIGS. 6-6B.

The pin 120 is adapted not to rotate relative to rotor 102 of FIGS. 1, 2 and piston 92 of the FIG. 3 embodiment in a manner as shown in FIGS. 6, 6A-6C. As shown, the head 122 of the pin 120 is provided with a pair of cylindrical grooves 126 that slide into a complementary receiving aperture 125 that is formed within the body of the downstream end 93 of piston 92, FIG. 3 or in the body of a connector portion 108 of rotor 102 of the FIGS. 1, 2 embodiment. The receiving aperture 125 has complementary cylindrically shaped protrusions 126a that when mated within the cylindrically shaped grooves 126 of pin 120 prevent pin 120 from rotating relative to rotor 102 or piston 92. The receiving aperture 125 is formed by two bores 125a and 125b connected by a slot with flat sides 125c with protrusions 126a formed on them. This allows an actuator to be easily disconnected from a valve pin by sliding the actuator sideways after removal of only four (4) connecting bolts. As can be seen in FIG. 6 to attach an actuator to a valve pin head 122, the actuator piston can be lowered onto the valve pin D then slid sideways S to align axes A, A'. U.S. Pat. No. 6,599,116 shows a similar dowel mechanism for preventing pin rotation, the entire disclosure of which is incorporated herein by reference as if fully set forth herein.

FIG. 3 shows an alternative embodiment where the rotary actuator 150 is interconnected to a second valve pin 160 with the second pin 160 and actuator 150 being mounted in-line with the axis IA of an inlet mechanism 170 that is disposed between and routes injection fluid from the injection machine 20 into an initial flow receiving channel 42 disposed within the hotrunner or distribution manifold 50. The pin 160 is interconnected to the rotary actuator 150 and its rotor 152 in the same manner as in the FIGS. 1, 2 embodiment such that the pin 160 rotates in unison with the rotor 152 of the actuator 150. In the FIG. 3 embodiment, the pin 160 has a fluted distal end portion 162 that serves to agitate and mix the injection fluid within channels 42 and 40 thus assisting in the flow of the injection fluid being more uniform in density and temperature as the injection fluid flows from the inlet portion 42 downstream through manifold channel 40 and eventually through the bore of the nozzle 60 and eventually through the gate 70.

In the FIG. 3 embodiment, the distal tip end 124a of the first linearly driven valve pin 120 is typically cylindrical or smooth on its outer surface unlike the fluted contour of the fluted portion 162 of the second pin 160.

Figure 4:
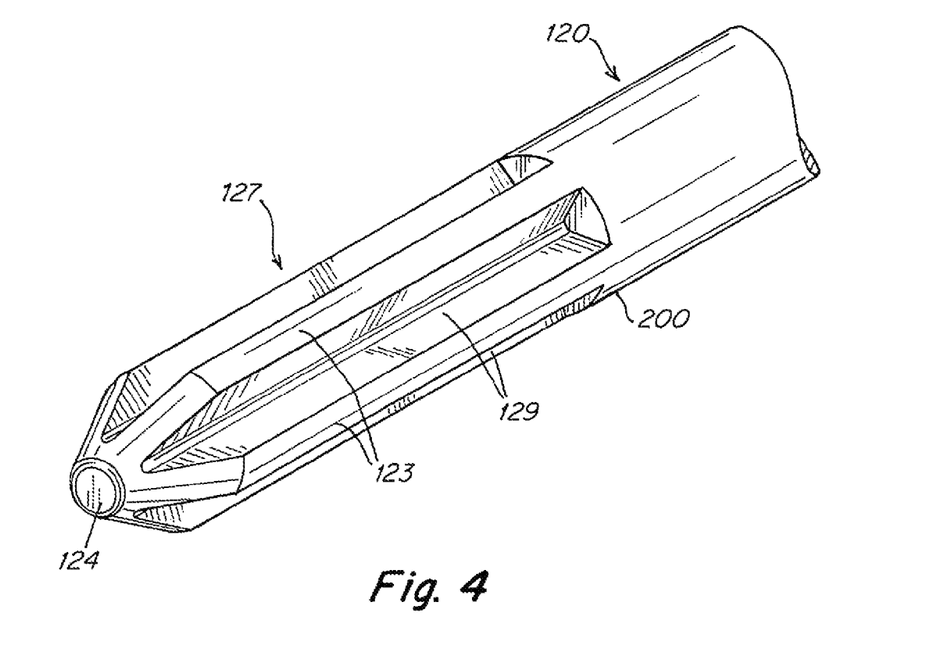
FIG. 4 is a side perspective view of a downstream end of a typical fluted valve pin.
Figure 5:
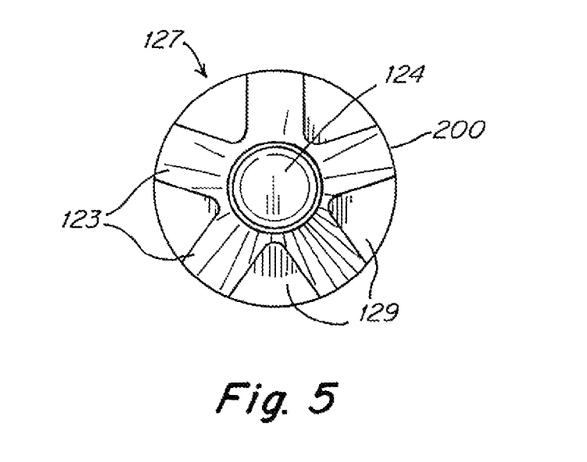
FIG. 5 is an end view of the fluted tip end of the valve pin of FIG. 4.

In the FIGS. 1, 2 embodiment, the single linearly driven valve pin 120 has an outer circumferential surface 200 that has a distal portion 127 that has an outer circumferential surface that has discontinuous protrusions or flutes 123, grooves 129, projections, fins or apertures or the like that generate a selected turbulence in the injection fluid flowing over and around the outer circumferential surface 200 when the valve pin 120 is rotated R around its pin axis A. The second valve pin 160 of the FIG. 3 embodiment can have the same flutes 123 and grooves 129 in its fluted portion 162 as shown in FIGS. 4, 5. Or, the outer surface of the fluted portion 162 can have another configuration of discontinuous protrusions or flutes, grooves, projections, fins or apertures or the like that generate a selected turbulence in the injection fluid flowing over and around the outer circumferential surface when the valve pin 160 is rotated R around its pin axis A.

As shown in FIGS. 1, 3, the injection molding apparatus 10 is comprised of an injection molding machine 20, a manifold 50 that receives injection fluid 15 from the machine 20 and routes the injection fluid 15 through a flow channel such as manifold channel 40 and nozzle 60 channel 63 that communicates with a gate 70 to a cavity 80 of a mold 82. The FIG. 1 apparatus includes a first actuator 90 and a second actuator 100 a closure valve pin 120 having a pin axis A interconnected to the actuators, the closure valve pin 120 being adapted to travel upstream and downstream along an axial path of travel A through the flow channel such that a distal tip end 124, 124a of the valve pin 120 is driven into and out of a position that closes flow through the gate 70.

The FIG. 3 apparatus has a second rotary actuator 150 that has a drive rotor 152 that is interconnected to a second valve pin 160.

Regarding the FIG. 1 apparatus, the first actuator 90 has a linear or axial driver 92 drivable along a reciprocal path of travel coincident or parallel to the axial path of travel A. The closure valve pin 120 is interconnected to the first actuator 90 such that the valve pin 120 is driven along the axial path of travel A and reciprocally upstream and downstream into and out of the position such that the distal tip end 124 closes and opens flow through the gate 70.

In a preferred embodiment, the controller 300 is programmed to controllably drive the actuator 90 and linear or closure valve pin 120 upstream and downstream between a fully closed position where the rate of flow of the molten plastic 15 is stopped, a fully open position at which rate of flow is fully open and variable positions intermediate the fully open and fully closed positions at which rate of flow of the molten plastic varies between stopped and fully open. The program contained in the controller can include instructions that enable the user to control the position of the tip end 124 of the valve pin at any selected profile of positions that vary the rate of flow of injection fluid 15 through the gate 70 which in turn vary according to any predetermined profile of rates that are less than the maximum rate of flow that correspond to the profile of pin positions such as described in U.S. Pat. No. 6,464,909 and international applications PCT/US2011/062099 and PCT/US2011/062096, the disclosures of which are incorporated herein by reference as if fully set forth herein.

The second actuator 100, 150 typically includes a rotor 102, 152 having a rotation axis A, IA, the rotor being interconnected to either the closure valve pin 120 or to a second valve pin 160 such that either the closure valve pin 120 or the second valve pin 160 is rotatably driven in unison with the rotor 102, 152 around an axis that is coincident with A or parallel IA to the pin axis or axial path of travel A of the closure pin.

The closure pin 120 or second pin 160 is preferably interconnected to the rotor 120, 152 and arranged and mounted such that a portion of the valve pin having grooves, protrusions, fins or the like is disposed and rotates R within the flow of injection fluid 15 that is routed through the manifold 50.

The second actuator 152 can be mounted such that the axis of the rotor 152 is generally coincident IA with an inlet that communicates flow of injection fluid 15 from the machine 20 to the manifold 50.

The second actuator 152 can be interconnected to the second valve pin 160.

The second actuator 100 can be mounted to the first actuator 90 where the closure valve pin 120 is non-rotatably interconnected to the rotor 102 of the second actuator 100 and the second actuator 100 and the closure valve pin 120 are adapted to travel along the axial path of travel A together with the linear or axial driver 92 of the first actuator 90.

The second valve pin 160 can comprise an elongated shaft having an outer circumferential surface having discontinuous protrusions 123, grooves 129, projections, fins or apertures one or more collectively 162 that are disposed within a fluid flow channel leading to the gate and generate a selected turbulence in the injection fluid 15 flowing through the channel and over the outer circumferential surface of the valve pin when the valve pin 160 is rotated R around its pin axis IA.

The closure valve pin 120 typically comprises an elongated shaft having an outer circumferential surface having discontinuous protrusions 123, grooves 129, projections, fins or apertures one or more collectively 127 that are disposed within a fluid flow channel leading to the gate and generate a selected turbulence in the injection fluid 15 flowing over the outer circumferential surface when the valve pin 120 when rotated around its pin axis A.

The head 122 of the pin 120, 160 that is interconnected to the rotor 102, 152 is preferably interconnected such that the pin rotates R around the rotation axis A, IA in unison with rotation of the rotor.

One or the other or both of the actuators 90, 100, 150 can be interconnected to a controller 300 that controllably instructs the actuators to drive the one or the other or both of the closure valve pin 120 and the second valve pin 160 according to a predetermined profile of axial travel or rotation.

With reference to FIGS. 1-6B, the invention also provides a method of performing an injection cycle, the method comprising injecting a fluid material 15 from an injection molding machine 20 into an apparatus 10 comprised of a manifold 50 that receives the injection fluid 15 from the injection molding machine 20 and routes the injection fluid 15 through a flow channel such as manifold channel 40 and nozzle 60 channel 63 that communicate with a gate 70 to a cavity 80 of a mold 82. The apparatus in such a method includes a first actuator 90 and a second actuator 100, 150, a closure valve pin 120 having a pin axis A interconnected to the actuators, the closure valve pin 120 being adapted to controllably drive the valve pin 120 upstream and downstream along an axial path of travel A through the flow channel such that a distal tip end 124, 124a of the valve pin 120 is driven into and out of a position that closes flow through the gate 70. The first actuator 90 in such a method has a linear or axial driver 92 drivable along a reciprocal path of travel coincident or parallel to the axial path of travel A, the closure valve pin 120 being interconnected to the first actuator 90 such that the valve pin is driven along the axial path of travel A and reciprocally upstream and downstream into and out of the position that closes flow through the gate 70. The second actuator 100, 150 in such a method comprises a rotor 102, 152 having a rotation axis A, IA, the rotor being interconnected to either the closure valve pin 120 or to a second valve pin 160 such that either the closure valve pin 120 or the second valve pin 160 is rotatably driven in unison with the rotor 102, 152 around an axis that is coincident with A or parallel IA to the pin axis or axial path of travel A of the closure pin. In such a method, the closure pin 120 or second pin 160 that is interconnected to the rotor 120, 152 has a selected portion that is disposed and is controllably rotatable within the flow of injection fluid 15 through the fluid flow channel 40, 63.

The controller 300 includes circuitry or a program that enables the user to control the linear and rotational speed, velocity and linear and rotational positioning of the valve pin at any and all linear, axial and rotational points and positions during the course of an injection cycle. A controller, as used herein, refers to electrical and electronic control apparati that comprise a single box or multiple boxes (typically interconnected and communicating with each other) that contain(s) all of the separate electronic processing, memory and electrical signal generating components that are necessary or desirable for carrying out and constructing the methods, functions and apparatuses described herein. Such electronic and electrical components include programs, microprocessors, computers, PID controllers, voltage regulators, current regulators, circuit boards, motors, batteries and instructions for controlling any variable element discussed herein such as length of time, degree of electrical signal output and the like. For example a component of a controller, as that term is used herein, includes programs, controllers and the like that perform functions such as monitoring, alerting and initiating an injection molding cycle including a control device that is used as a standalone device for performing conventional functions such as signaling and instructing an individual injection valve or a series of interdependent valves to start an injection, namely move an actuator and associated valve pin from a gate closed to a gate open position. In addition, although fluid driven actuators are employed in typical or preferred embodiments of the invention, actuators powered by an electric or electronic motor or drive source can alternatively be used as the actuator component. The user can program the controller 300 via data inputs on a user interface to instruct the actuators 90, 100 to drive pins 120, 160 according to any predetermined profile of positions, velocities and the like.

As shown in FIGS. 1-6b, an injection molding apparatus 10 is comprised of an injection molding machine 20, a manifold 50 that receives injection fluid 15 from the machine 20 and routes the injection fluid 15 through a flow channel such as manifold channel 40 and nozzle 60 channel 63 communicating with a gate 70 to a cavity 80 of a mold 82, a first actuator 90 and a second actuator 100, 150, a closure valve pin 120 having a pin axis A interconnected to the actuators, the closure valve pin 120 being adapted to controllably drive the valve pin 120 upstream and downstream along an axial path of travel A through the flow channel such that a distal tip end 124, 124a of the valve pin 120 is driven into and out of a position that closes flow through the gate 70. The first actuator 90 includes a linear or axial driver 92 drivable along a reciprocal path of travel coincident or parallel to the pin axis or axial path of travel A of the closure pin 120. The closure valve pin 120 is interconnected to the first actuator 90 such that the valve pin 120 is driven along the axial path of travel A and reciprocally upstream and downstream into and out of the position that closes flow through the gate 70. The second actuator 100, 150 is comprised of a rotor 102, 152 having a rotation axis A, IA, the rotor being interconnected to either the closure valve pin 120 or to a second valve pin 160 such that either the closure valve pin 120 or the second valve pin 160 is rotatably driven in unison with the rotor 102, 152 around an axis that is coincident A with or parallel IA to the pin axis A of the closure pin. Preferably, the closure pin 120 or second pin 160 is configured and adapted such that a selected portion of the closure pin or second pin having protrusions, fins or the like is disposed and rotatable within the flow of injection fluid 15 that is routed through a flow channel 40, 63.

What is claimed is:

1. An injection molding apparatus comprising an injection molding machine, a manifold that receives injection fluid from the machine and routes the injection fluid through a flow channel communicating with a gate to a cavity of a mold, characterized in that the apparatus includes:

a first actuator and a second actuator, a closure valve pin having a pin axis, the closure valve pin being adapted to be controllably driven upstream and downstream along an axial path of travel through the flow channel such that a distal tip end of the closure valve pin is driven into and out of a position that closes flow through the gate, the first actuator having a linear or axial driver drivable along a reciprocal path of travel coincident or parallel to the axial path of travel, the closure valve pin being interconnected to the first actuator such that the valve pin is driven along the axial path of travel and reciprocally upstream and downstream into and out of the position that closes flow through the gate, the second actuator comprising a rotor having a rotation axis, the rotor being interconnected to a second valve pin such that the second valve pin is rotatably driven in unison with the rotor around the rotation axis, the second pin that is interconnected to the rotor being disposed and rotatable within the flow of injection fluid, wherein the second valve pin comprises an elongated shaft having an outer circumferential surface having discontinuous protrusions, grooves, projections, fins or apertures that are rotatably disposed within the injection fluid flowing through the flow channel, the protrusions, grooves, projections, fins or apertures generating a selected turbulence in the injection fluid flowing through the flow channel when the second valve pin is rotated around its pin axis.

2. The apparatus of claim 1 wherein the second actuator is mounted such that the axis of the rotor is generally coincident with an axis of an inlet that communicates flow of injection fluid from the machine to the manifold.

3. The apparatus of claim 1 wherein the closure valve pin comprises an elongated shaft having an outer circumferential surface having discontinuous protrusions, grooves, projections, fins or apertures that are rotatably disposed within the injection fluid flowing through the flow channel, the protrusions, grooves, projections, fins or apertures generating a selected turbulence in the injection fluid flowing through the flow channel when the valve pin is rotated around its pin axis.

4. The apparatus of claim 1 wherein the closure valve pin is interconnected to the first actuator and adapted such that the closure valve pin is controllably rotatable around an axis of the closure valve pin.

5. The apparatus of claim 1 wherein one or the other or both of the first and second actuators are interconnected to a controller that controllably instructs the actuators to drive the one or the other or both of the closure valve pin and the second valve pin along a predetermined profile of axial travel or rotation respectively.

6. A method of driving a valve pin in an injection molding apparatus comprised of an injection molding machine, a manifold that receives injection fluid from the machine and routes the injection fluid through a flow channel communicating with a gate to a cavity of a mold, a first actuator and a second actuator, a closure valve pin having a pin axis, the closure valve pin being adapted to be controllably driven upstream and downstream along an axial path of travel through the flow channel such that a distal tip end of the valve pin is driven into and out of a position that closes flow through the gate, the method comprising:

interconnecting a closure valve pin to a first actuator having an axial driver drivable along a reciprocal path of travel coincident with or parallel to the axial path of travel such that the valve pin is driven reciprocally upstream and downstream into and out of the position that closes flow through the gate, interconnecting a second valve pin to a second actuator comprising a rotor having a rotation axis such that second valve pin (160) is rotatably driven (R) in unison with the rotor around an axis coincident with or parallel to the pin axis of the second valve pin, forming the second valve pin to comprise an elongated shaft having an outer circumferential surface having discontinuous protrusions, grooves, projections, fins or apertures that generate a selected turbulence in the injection fluid flowing through the flow channel when the second valve pin is rotated around its pin axis, adapting the second pin that is interconnected to the rotor to be disposed within the flow of injection fluid that is routed from the injection molding machine to the gate, driving the first actuator to drive its interconnected pin into and out of the position that closes flow through the gate, driving the second actuator such that the second pin is rotatably driven and such that a selectable portion of the second pin is rotated within the flow of injection fluid that is routed to the gate.

7. The method of claim 6 further comprising mounting the second actuator such that the axis of the rotor is generally coincident with an axis of an inlet from the injection molding machine that communicates flow of injection fluid from the machine to the manifold.

8. The method of claim 6 wherein the head of the closure valve pin interconnected to the first actuator and adapted to rotate the closure valve pin around an axis of the closure valve pin.

9. The method of claim 6 further comprising instructing the actuators to drive one or the other or both of the closure valve pin and the second valve pin according to a predetermined profile of axial travel or rotation respectively over the course of an injection cycle.

10. An injection molding apparatus comprising an injection molding machine, a manifold that receives injection fluid from the machine and routes the injection fluid through a fluid flow channel communicating with a gate to a cavity of a mold, a first actuator and a second actuator, a closure valve pin having a pin axis interconnected to at least the first actuator, the actuators and the closure valve pin being arranged for controllably driving the closure valve pin axially upstream and downstream through the flow channel such that a distal tip end of the valve pin is driven into and out of a position that closes flow through the gate, the first actuator having an axial driver drivable along a reciprocal path of axial travel, the second actuator being mounted to the axial driver such that the second actuator is driven along the path of axial travel, the closure valve pin being mounted to the second actuator such that the valve pin is drivable along the path of axial travel, the second actuator comprising a rotor that is rotatably drivable around an axis coincident or parallel to the path of axial travel of the closure valve pin, the rotor of the second actuator being interconnected to the closure valve pin such that a selected portion of the valve pin is disposed within the fluid flow channel leading to the gate and the selected portion of the valve pin is rotatably drivable to rotate the selected portion of the pin within the fluid flow channel to agitate injection fluid flowing through the channel, a second valve pin interconnected to another actuator comprising a rotor having a rotation axis, such that the second valve pin is rotatably driven in unison with the rotor around the rotation axis, the second pin being disposed and rotatable within the flow of injection fluid, wherein the second valve pin comprises an elongated shaft having an outer circumferential surface having discontinuous protrusions, grooves, projections, fins or apertures that are rotatably disposed within the injection fluid flowing through the flow channel, the protrusions, grooves, projections, fins or apertures generating a selected turbulence in the injection fluid flowing through the flow channel when the second valve pin is rotated around its pin axis.

11. The apparatus of claim 10 wherein the closure valve pin is comprised of an elongated shaft having an outer circumferential surface having discontinuous protrusions, grooves, projections, fins or apertures that are disposed within a fluid flow channel, the closure valve pin being controllably rotatable to rotate the protrusions, grooves, projections, fins or apertures within the injection fluid flowing through the fluid flow channel and to generate a selected turbulence in the injection fluid when the valve pin is rotated around its pin axis.

12. The apparatus of claim 10 wherein the first and second actuators are driven individually or collectively by hydraulic fluid, pneumatic fluid or an electric motor.

13. The apparatus of claim 10 wherein the closure valve pin has a head that is interconnected to the rotor of the second actuator such that the valve pin is non-rotatably mounted relative to the rotor of the second actuator.

14. The apparatus of claim 10 wherein the closure valve pin has a head interconnected to the rotor such that the closure valve pin rotates around its pin axis in unison with rotation of the rotor.

15. The apparatus of claim 10 wherein one or the other or both of the first and second actuators is interconnected to a controller that controllably instructs the actuators to drive the valve pin according to a predetermined profile of axial travel or rotation.

16. A method of performing an injection cycle, the method comprising injecting a fluid material from an injection molding machine into an apparatus comprised of a manifold that receives the injection fluid from the injection molding machine and routes the injection fluid through a flow channel communicating with a gate to a cavity of a mold, a first actuator and a second actuator, a closure valve pin having a pin axis, the closure valve pin being adapted to be driven upstream and downstream along an axial path of travel through the flow channel such that a distal tip end of the valve pin is driven into and out of a position that closes flow through the gate, the first actuator having a linear or axial driver drivable along a reciprocal path of travel coincident or parallel to the axial path of travel, the closure valve pin being interconnected to the first actuator such that the closure valve pin is driven along the axial path of travel and reciprocally upstream and downstream into and out of the position that closes flow through the gate, the second actuator comprising a rotor having a rotation axis, the rotor of the second actuator being interconnected to a second valve pin such that the second valve pin is rotatably driven in unison with the rotor around the rotation axis, the second pin having a selected portion that is disposed and controllably rotatable within the flow of injection fluid flowing through the fluid flow channel to agitate or mix the injection fluid.

* * * * *

UNITED STATES PATENT AND TRADEMARK OFFICE
CERTIFICATE OF CORRECTION

| | | |
|---|---|---|
| PATENT NO. | : 9,873,216 B2 | Page 1 of 1 |
| APPLICATION NO. | : 14/962358 | |
| DATED | : January 23, 2018 | |
| INVENTOR(S) | : Vito Galati | |

It is certified that error appears in the above-identified patent and that said Letters Patent is hereby corrected as shown below:

On the Title Page

Please add the priority claim to U.S. provisional application under Related U.S. Application Data (63):
-- U.S. 61/869,950, filed on Aug. 26, 2013 --

Signed and Sealed this
Twenty-ninth Day of May, 2018

Andrei Iancu
*Director of the United States Patent and Trademark Office*